United States Patent [19]

Van Der Hoorn et al.

[11] Patent Number: 5,023,975
[45] Date of Patent: Jun. 18, 1991

[54] BONING APPARATUS FOR REMOVING RIBS FROM A BELLY

[76] Inventors: Rudolf J. Van Der Hoorn, Pylkruidhof 5, Nuenen, Netherlands, 5672 BK; Martinus J. Jaspers, Bloemhoefstraat 6, Nuenen, Netherlands, 5674 NT; Johannes J. Bak, Utrecht, all of Netherlands

[21] Appl. No.: 408,405

[22] Filed: Sep. 15, 1989

Related U.S. Application Data

[63] Continuation of Ser. No. 277,225, Nov. 29, 1988, abandoned.

[30] Foreign Application Priority Data

Nov. 30, 1987 [NL] Netherlands ............ 8702872

[51] Int. Cl.5 .......................................... A22C 17/04
[52] U.S. Cl. ........................................ 17/46; 17/16; 17/52
[58] Field of Search ............ 17/46, 56, 52, 1 G, 17/1 R

[56] References Cited

U.S. PATENT DOCUMENTS

| | | | |
|---|---|---|---|
| 3,940,830 | 3/1976 | Anderson et al. | 17/45 |
| 4,134,181 | 1/1979 | Schneider, Jr. | 17/1 R |
| 4,484,375 | 11/1984 | Brower | 17/56 |
| 4,495,675 | 1/1985 | Hill, deceased et al. | 17/46 |
| 4,542,559 | 9/1985 | Brower | 17/46 |
| 4,639,974 | 2/1987 | Olson | 17/46 |
| 4,669,150 | 6/1987 | Manmoto et al. | 17/46 |
| 4,793,025 | 12/1988 | Melville et al. | 17/46 |

FOREIGN PATENT DOCUMENTS

| | | |
|---|---|---|
| 1570426 | 1/1969 | France . |
| 94736 | 10/1969 | France . |
| 2226933 | 11/1974 | France . |
| 2357181 | 2/1978 | France . |
| 592417 | 10/1977 | Switzerland . |

Primary Examiner—Willis Little
Attorney, Agent, or Firm—Michael N. Meller

[57] ABSTRACT

Boning apparatus, for removing ribs from a belly (32), with a flexible and drivable support surface (4, 4a), guided over a guide roller (6, 6a), for supporting the belly (32) to be processed, a number of cords (14) disposed side by side thereabove including an acute angle with said surface (4, 4a) guided over said roller (6, 6a) and driven in the same direction as the support surface (4, 4a), and a striker mechanism (53, 53a) in front of the guide roller (6, 6a), covering the part of the belly (32) which is to be boned, driven in a reciprocating movement in the direction of the guide roller, and acting on the ribs (31) protruding from the belly.

16 Claims, 5 Drawing Sheets

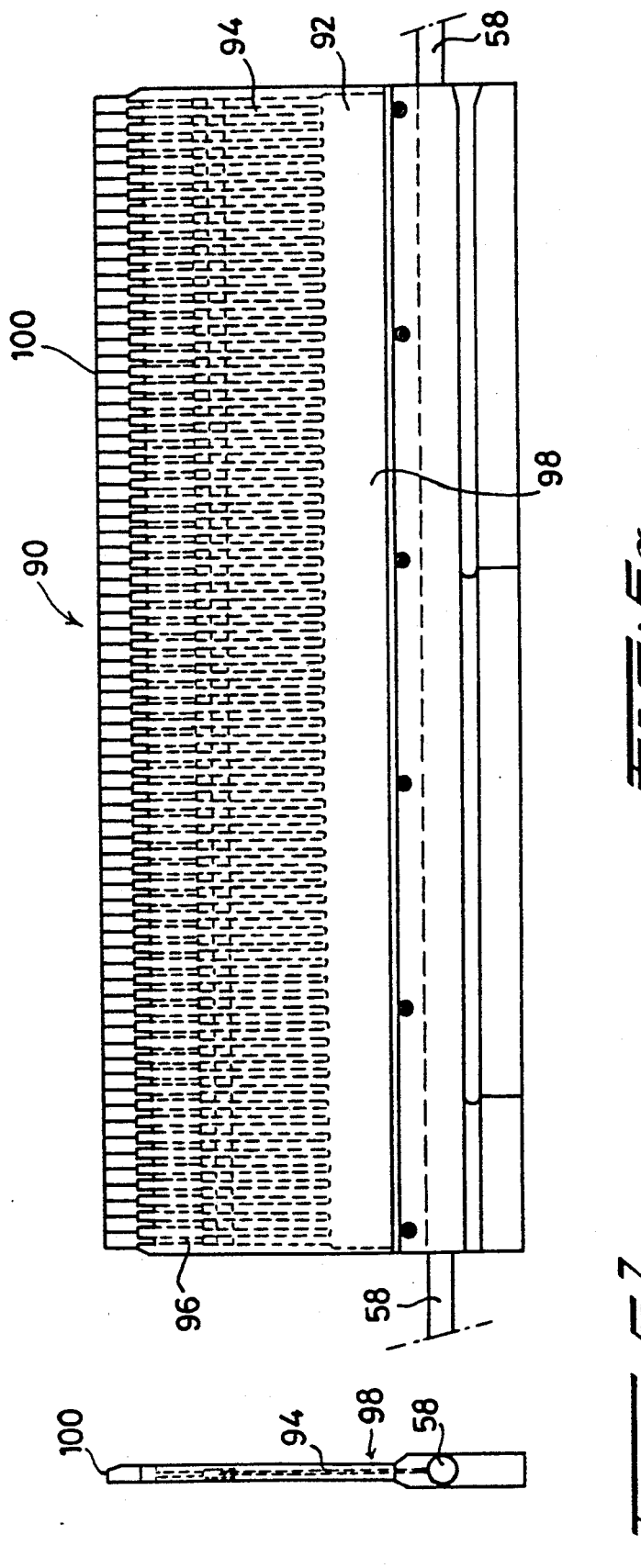

BONING APPARATUS FOR REMOVING RIBS FROM A BELLY

This application is a continuation of application Ser. No. 277,225, filed Nov. 29, 1988, now abandoned.

BACKGROUND OF THE INVENTION

The invention relates to a boning apparatus intended for removing the ribs present in a belly, particularly a pork belly.

The boning of a pork belly is an operation which up to now has been carried out mostly by hand, possibly with the aid of auxiliary tools of the kind described in NL-A-8303476 and DE-A-2237374. Even when such auxiliary tools are used, boning remains a tiring and time consuming operation.

There does exist an apparatus for carrying out this operation mechanically using a thin cutting wire for separating the meat from the bones, but this apparatus does not work efficiently and results into an appreciable loss of meat and the endproduct is not of a high quality.

The invention aims to provide an apparatus with which the ribs can be removed from a pork belly quickly and reliably and without wastage of meat. Preferred embodiments are described in the sub-claims.

SUMMARY OF THE INVENTION

To this end the apparatus comprises a flexible and drivable support surface, guided over a guide roller, for supporting the belly to be processed, a number of cords or strings disposed thereabove and side by side in the direction of the width thereof which include an acute angle with said surface in the direction of the guide roller, are guided over said roller and are driven in the same direction as the support surface, and a striker mechanism which is positioned in front of the guide roller, covering the part of the belly which is to be boned, and can be driven in a reciprocating movement in the direction of the guide roller, and acts on the ribs protruding from the belly.

When the belly enters between the cords or strings and the supporting surface, the cords or strings come to lie in the depressions present between and next to the ribs, so that the spacing of these cords need not be related to the mutual spacing of the ribs; consequently, the apparatus can remain very simple. During and after its passage over the guide roller, the belly follows the path as determined by the course of the cords or strings, while the ribs move out of the belly and are freed by the striker mechanism. In practice it has then been found that each of the ribs, without any of the surrounding membranes, is freed from the belly, which in practice is seen as a great advantage; not only is there no wastage of meat, but in addition the meat is protected by the membrane left behind.

Preferably a curved convex guide surface in front and above of the guide roller is provided to improve the grip of the cords or strings on the belly.

In a preferred embodiment the striker mechanism comprises a number of juxtaposed elongate striker fingers, each of which is pressed at its free end by spring action towards the guide roller and is by its end connected to a bearer adapted to be driven in a reciprocating movement.

Preferably the fingers are embedded in a block of resilient plastic material comprising a core with a number of parallel resilient metal strips, the bottom of said block being connected to the bearer.

The bearer can be connected at both ends to a rocking arm supported pivotally at one end and connected at the other end to an eccentric mechanism, while each of the cords or strings can be guided over a tensioning roller which is under spring tension. It is however, also possible to use cords or strings which by themselves have the necessary elasticity to obtain this spring tension.

SUMMARY OF THE DRAWINGS

The invention will now be explained with reference to the drawing, in which:

FIG. 2a schematic side view of said apparatus;

FIG. 2b side view of a slightly modified embodiment;

FIG. 5a is a front view of another embodiment of the striker mechanism, used in the apparatus according to the invention;

FIG. 5b shows a side view thereof.

In FIGS. 1 to 3 an apparatus according to the invention is indicated by the general reference 2. This apparatus comprises a first endless conveyor belt 4 guided over rollers 6 and 8 mounted in the frame 10 and driven in the direction of the arrow 12 by a suitable drive motor (not shown). Furthermore, the apparatus comprises a number of tensioned mutually parallel cords or strings 14 guided over the guide rollers 16 to 24. The drawings shows how the roller 22 is under the tension of a strong tension spring 26; this roller 22 may of course be replaced by a number of individual rollers, each for one cord and each tensioned by an individual tension spring.

Figure 1:
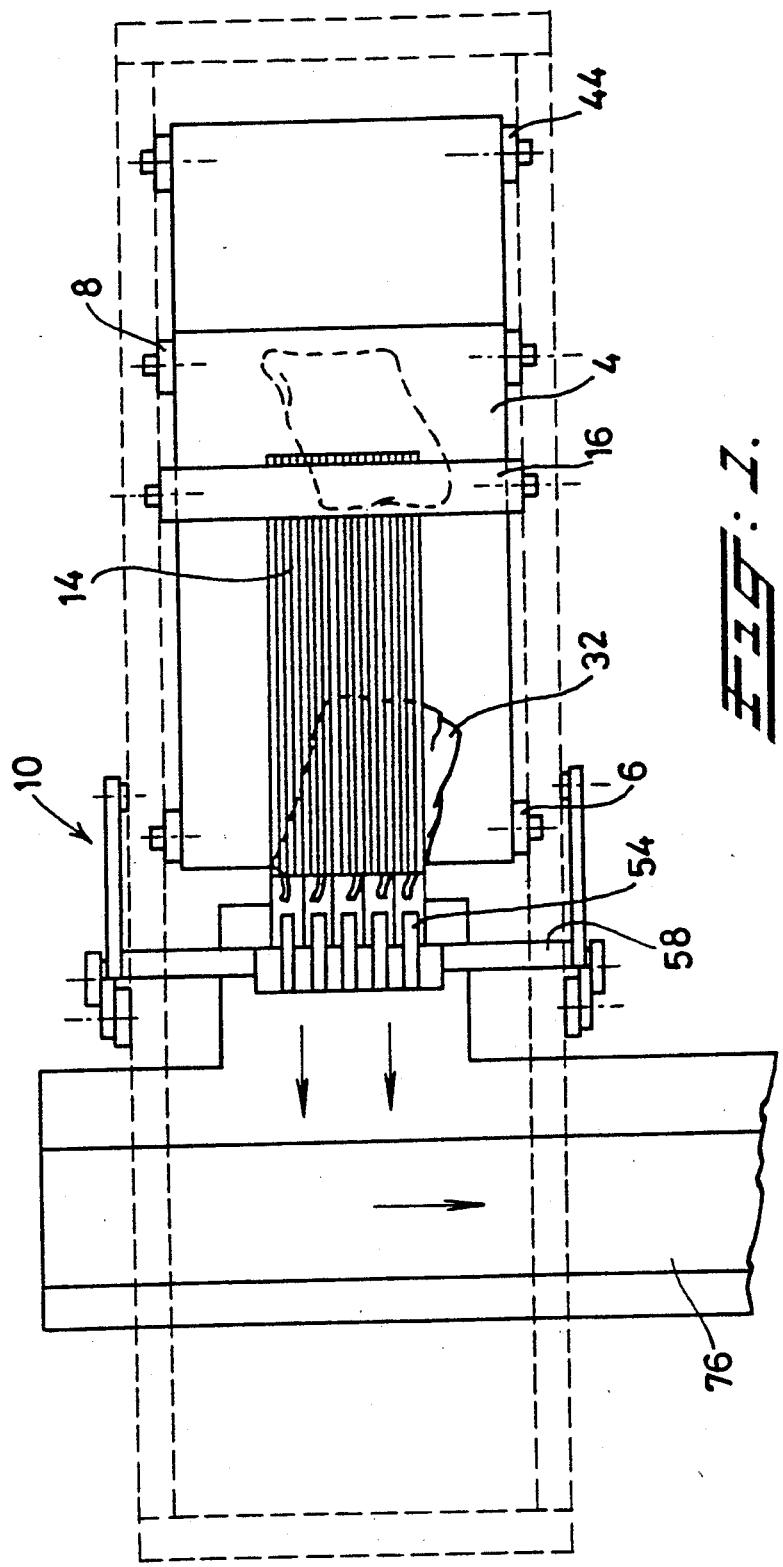
FIG. 1 is a schematic top plan view of an apparatus according invention.

Of course this combination of guide roller(s) and spring(s) can be dispensed with when the cords themselves have sufficient elasticity.

By a drive means (not shown) the cords are driven in the direction of the arrow 28 at a longitudinal speed equal to the speed of the belt 4 which is driven in the direction of the arrow 12. A set of pins 30 mounted in the frame 10 a short distance upstream of the roller 16 and disposed parallel to one another ensure that the cords will all be directed parallel to one another when they pass over the roller 16. The function of these pins can be replaced by guide grooves in the surface of the roller 16.

Figure 2:
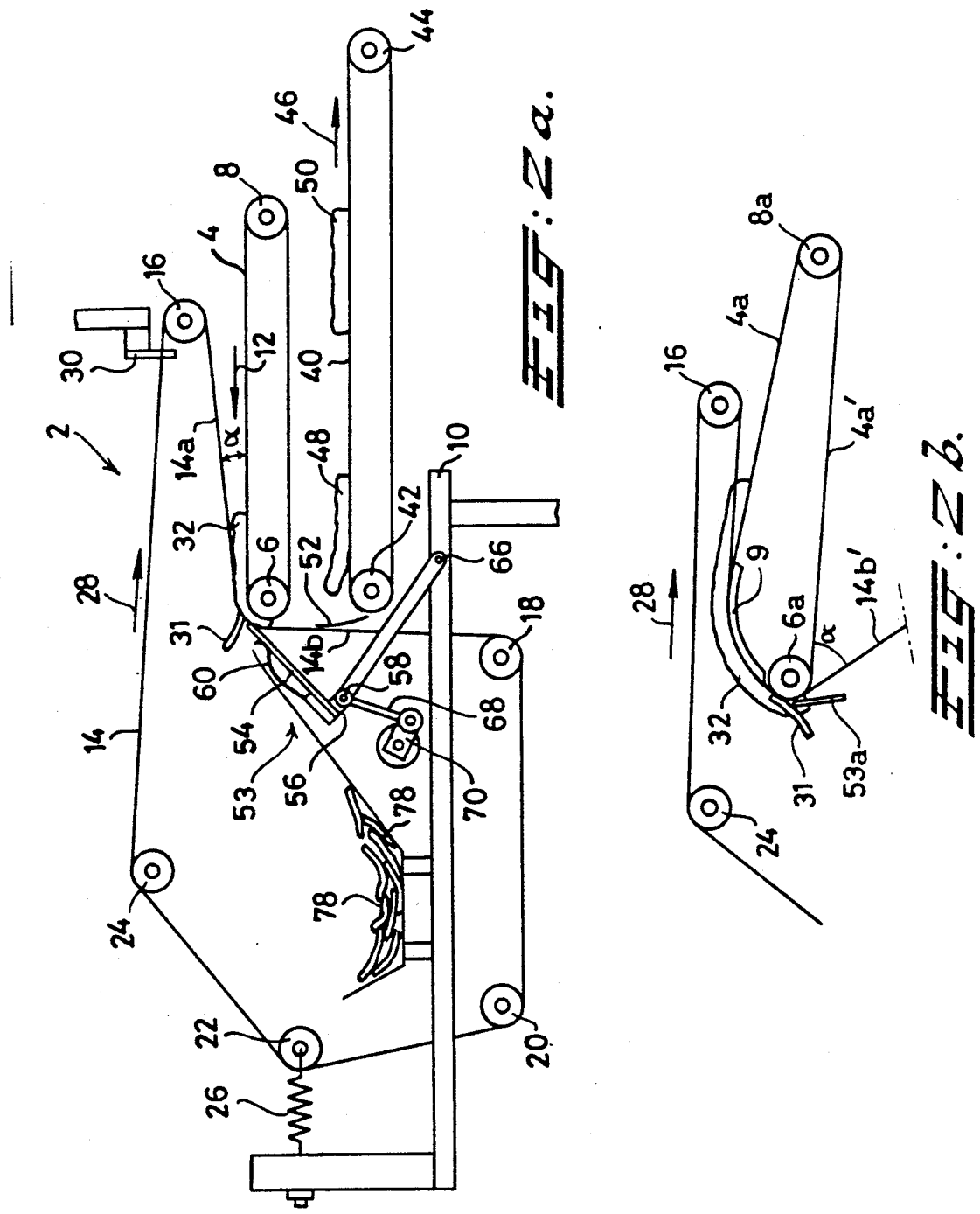

As FIG. 2a shows, after passing over the guide roller 16, the cords 14 extend over a path 14a at an acute angle α to the conveyor belt 4; after passing the roller 6 they extend over a downwardly directed path 14b. The cords are thus guided over the roller 6 at an angle slightly in excess of 90°.

Under the conveyor belt 4 is disposed a second conveyor belt 40, which is guided over rollers 42 and 44 and is driven by a motor (not shown) in the direction of the arrow 46. This conveyor belt 40 is intended for the discharge of the bellies from which the ribs have been removed, such as the bellies 48, 50. The transfer of the ribless bellies from the belt 4 to the belt 40 is facilitated by the provision of a guide plate 52.

In front of the guide roller 6 is disposed a striker mechanism (53) consisting of a number of flat, elongate striker fingers 54 lying side by side and each pivotally fastened at the bottom at 56 to a supporting rod 58 and each of them being acted on by a leaf spring 60 fastened to said bearer 58. The supporting rod 58 is fastened at each end to a respective support arm 62, 64, each of which support arms is pivotally connected at 66 to the frame 10 and driven in a reciprocating movement by the eccentric 68, 70, which is carried by the shaft 72 and driven by way of a drive belt 74 by a drive motor (not shown).

Figure 3:
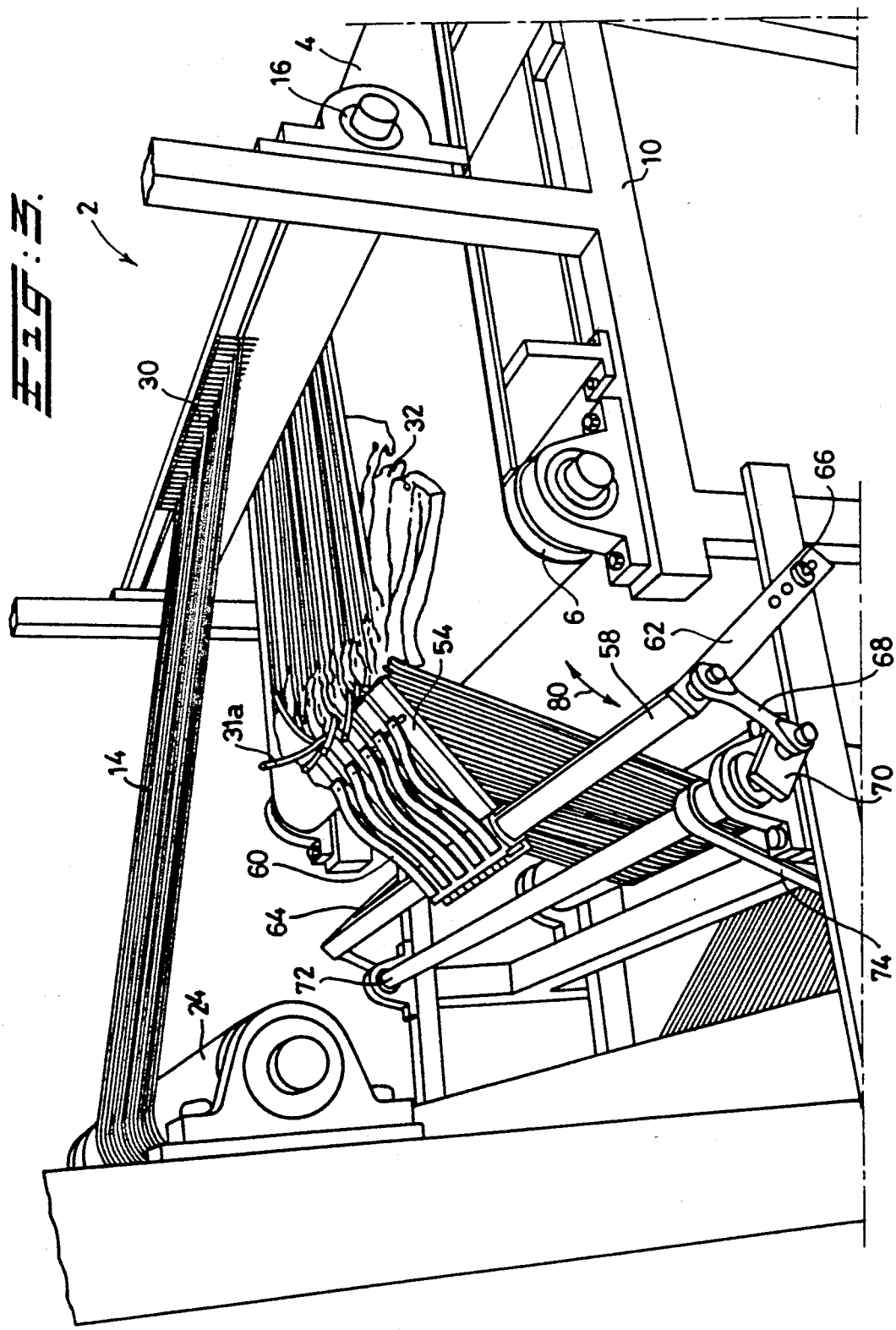
FIG. 3 is a view in perspective of the result obtained with the apparatus according to the invention.

Finally, the frame carries a receiving through 76 for the ribs 78 removed from the supplied bellies; for the sake of clarity this is not shown in FIG. 3.

The apparatus operates as follows:

A belly, such as the belly 32, is placed on the conveyor belt 4 in such a manner that the ribs (31a–31g) therein lie in the longitudinal direction of the belt, and thus also in the longitudinal direction of the cords 14. Each of the membranes surrounding the ribs is first cut on the upper side in the longitudinal direction of the ribs, either by hand or with the aid of a mechanism which will be described below; the ribs themselves are of course still completely embedded in the belly. Through the movement of the belt 4 in the direction of the arrow 12, the belly 32 is gradually pulled under the cords 14 at the end of the path 14a of the cords, which thus lie in the depressions existing between and next to the ribs. In this regard it should be observed that because of their flexibility the cords will adapt and conform to the space and the distance between adjoining ribs; it may thus happen that one, two or three cords will lie between two adjoining ribs. This means that the spacing of the cords, as determined by the pins 30, need not be related to the spacing of the ribs, which of course is a great advantage. Simultaneously with the movement of the belt, the drive shaft 72 is also rotatingly driven, so that by means of the eccentric mechanism 68-60 the bearer 58 is driven in the direction of the arrows 80 in a reciprocating movement, the striker bars 54 following this movement.

Figure 4:
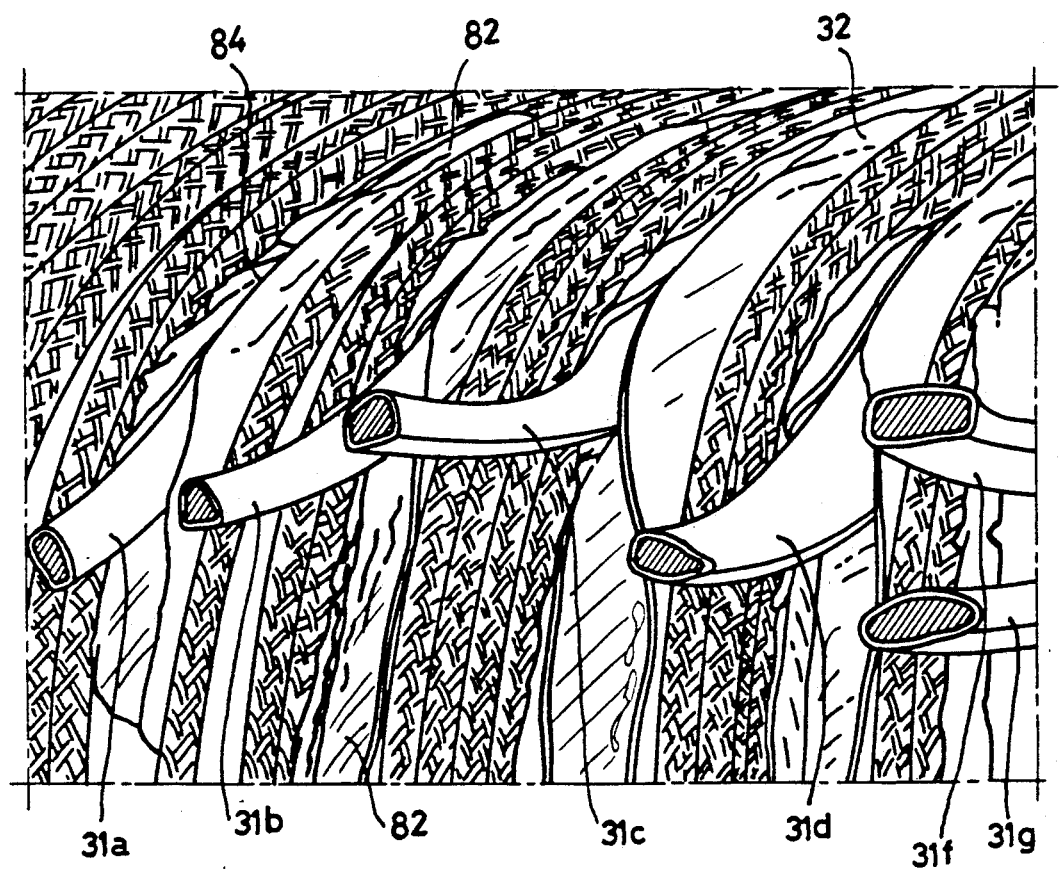
FIG. 4 is a view in perspective of the result obtained with the apparatus according to the invention.

As shown in the drawings, the belly 32, guided by the parts 15 of the cords tensioned over it, is pulled over the guide roller 6, but the ribs lying between the cords do not follow this movement, and their tips pass out between the cords. The ends of the striker bars 54 subjected to pressure by the leaf springs 60 strike, at the points where the ribs protrude, against the undersides of said ribs, which are thus freed from the belly, as shown in FIG. 4. For the sake of clarity the striker bars 54 are not shown in this figure.

When the belly 32 has completely passed the guide roller 6, all the ribs 31 have been removed from it and passed into the receiving through 78. The belly itself is received on the lower conveyor belt 40 (as indicated at 48 and 50) and is discharged.

In practice it has been found that the ribs removed from the belly are entirely free from the membrane surrounding them and thus also from residues of meat, as shown in FIG. 4, so that the belly is obtained in which these membrane parts (indicated by the reference numeral 82) still remain on the meat.

In practice this is regarded as a great advantage, since the membranes provide protection for the meat thereunder.

FIG. 2b shows how the conveyor belts indicated over a curved surface 9 while the part 14b' of the cords includes a sharp angle α with the lower part 4a' of the belt 4a, so that the cords are angled away from the strikers 68a. This improves the passage of the belly 32 through the apparatus. The figure also shows the striker mechanism 53a.

FIG. 4 also shows how cuts 48 are made in the upper face of the membrane at the sites of the ribs 31a–31g, which is necessary in order to facilitate the release of the ribs. These cuts can of course be made in the usual manner by hand, this being a quick and easy operation; however, it is also possible to make these cuts with the aid of a cutting mechanism separately provided for the purpose in the apparatus according to the invention.

FIG. 5 shows another embodiment of the striker mechanism, indicated as a whole by reference numeral 90 and attached to the supporting rod 58 which is the same one as shown in the FIGS. 2a and 3. It comprises a sheet of thin highly resilient material 92 provided with slot-shaped cut outs 94 resulting into a number of metal fingers such as 96 and the whole is embedded in a block 98 suitable plastics, for instance polyuretheen. The upper ends of the fingers, indicated by 100 are free from each other so that the complete striker mechanism has upper ends which can to a certain extend move independently of each other while the whole, although being flexible, still hangs together.

What is claimed is:

1. Boning apparatus, for removing the ribs from a belly, comprising a flexible and drivable support surface, guided over a guide roller, for supporting the belly to be processed, a number of cords or strings disposed thereabove and side by side in the direction of the width thereof which include an acute angle with said surface in the direction of the guide roller, are guided over said roller and are driven in the same direction as the support surface, and a striker mechanism which is positioned in front of the guide roller, covering the part of the belly which is to be boned, and can be driven in a reciprocating movement in the direction of the guide roller, and acts on the ribs protruding from the belly.

2. Apparatus according to claim 1, comprising a curved convex guide surface in front and above of the guide roller.

3. Apparatus according to claim 1, in which the striker mechanism comprises a number of juxtaposed elongate striker fingers, each of which is pressed at its free end by spring action towards the guide roller and is by its end connected to a bearer adapted to be driven in a reciprocating movement.

4. Apparatus according to claim 3, in which the fingers are embedded in a block of resilient plastic material comprising a core with a number of parallel resilient metal strips, the bottom of said block being connected to the bearer.

5. Apparatus according to claim 1, in which the bearer is connected at both ends to a rocking arm supported pivotally at one end and connected at the other end to an eccentric mechanism.

6. Apparatus according to claim 1, in which the each of cords or strings is guided over a tensioning roller which is under spring tension.

7. Apparatus according to claim 1, in which the support surface is formed by an endless belt guided over the guide roller and a second roller placed at a distance from the latter.

8. Apparatus according to claim 1, in which an endless discharge belt placed under the support surface and discharging the bellies from which the ribs have been removed.

9. Apparatus according to claim 1, comprising a pressure roller placed above the guide roller and urged by spring action in the direction of said roller.

10. Apparatus according to claim 2, comprising a pressure roller placed above the guide roller and urged by spring action in the direction of said roller.

11. Apparatus according to claim 3, comprising a pressure roller placed above the guide roller and urged by spring action in the direction of said roller.

12. Apparatus according to claim 4, comprising a pressure roller placed above the guide roller and urged by spring action in the direction of said roller.

13. Apparatus according to claim 5, comprising a pressure roller placed above the guide roller and urged by spring action in the direction of said roller.

14. Apparatus according to claim 6, comprising a pressure roller placed above the guide roller and urged by spring action in the direction of said roller.

15. Apparatus according to claim 7, comprising a pressure roller placed above the guide roller and urged by spring action in the direction of said roller.

16. Apparatus according to claim 8, comprising a pressure roller placed above the guide roller and urged by spring action in the direction of said roller.

* * * * *